United States Patent
Lee et al.

(10) Patent No.: US 9,467,747 B2
(45) Date of Patent: *Oct. 11, 2016

(54) APPARATUS AND METHOD FOR SEARCHING MULTIMEDIA CONTENT

(71) Applicant: SAMSUNG ELECTRONICS CO., LTD., Suwon-si (KR)

(72) Inventors: Hyeon-ji Lee, Suwon-si (KR); Joon-hwan Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 146 days.

This patent is subject to a terminal disclaimer.

(21) Appl. No.: 13/752,096

(22) Filed: Jan. 28, 2013

(65) Prior Publication Data

US 2013/0139203 A1 May 30, 2013

Related U.S. Application Data

(63) Continuation-in-part of application No. 11/953,965, filed on Dec. 11, 2007, now Pat. No. 8,402,491.

(30) Foreign Application Priority Data

Apr. 3, 2007 (KR) ........................ 10-2007-0032867

(51) Int. Cl.
*H04N 7/10* (2006.01)
*H04N 7/167* (2011.01)
(Continued)

(52) U.S. Cl.
CPC ...... *H04N 21/4828* (2013.01); *G06F 17/3087* (2013.01); *G06F 17/30817* (2013.01);
(Continued)

(58) Field of Classification Search
CPC .................................................. H04L 65/602
USPC ...... 348/144; 345/619; 725/53, 34; 382/100; 455/414.2
See application file for complete search history.

(56) References Cited

U.S. PATENT DOCUMENTS 5,610,822 A 3/1997 Murphy
6,865,746 B1 3/2005 Herrington et al.
(Continued)

FOREIGN PATENT DOCUMENTS

CN 1507696 A 6/2004
EP 1 538 829 A1 6/2005
(Continued)

OTHER PUBLICATIONS

Communication dated Jun. 21, 2013 from the Korean Intellectual Property Office in a counterpart application No. 10-2007-0032867.
(Continued)

*Primary Examiner* — Hunter B Lonsberry
(74) *Attorney, Agent, or Firm* — Sughrue Mion, PLLC

(57) ABSTRACT

A multimedia content searching apparatus includes: an image receiving unit that receives an image having additional information from an external device; an additional information reading unit that reads the additional information from the image received from the image receiving unit; a multimedia content searching unit that recommends a multimedia content to a user by searching for the multimedia content which is related to the additional information using the additional information read by the additional information reading unit; and an information comparing unit that compares the additional information read by the additional information reading unit with multimedia content information provided from a content provider, and the multimedia content searching unit searches for the multimedia content related to the additional information based on the result of the comparison by the information comparing unit.

10 Claims, 7 Drawing Sheets

(51) Int. Cl.
*H04N 21/482* (2011.01)
*G06F 17/30* (2006.01)
*H04N 5/445* (2011.01)
*H04N 7/16* (2011.01)
*H04N 21/434* (2011.01)
*H04N 21/44* (2011.01)
*H04N 21/45* (2011.01)
*H04N 21/472* (2011.01)
*H04N 21/81* (2011.01)
*H04N 21/84* (2011.01)

(52) U.S. Cl.
CPC ............. *H04N5/445* (2013.01); *H04N 7/163* (2013.01); *H04N 21/4345* (2013.01); *H04N 21/44008* (2013.01); *H04N 21/4524* (2013.01); *H04N 21/47214* (2013.01); *H04N 21/4825* (2013.01); *H04N 21/8153* (2013.01); *H04N 21/84* (2013.01)

(56) References Cited

U.S. PATENT DOCUMENTS

| | | | |
|---|---|---|---|
| 7,640,563 | B2 | 12/2009 | Marsh |
| 8,402,491 | B2* | 3/2013 | Lee .................. G06F 17/30817 382/100 |
| 2002/0041328 | A1* | 4/2002 | LeCompte et al. ............ 348/144 |
| 2002/0042923 | A1 | 4/2002 | Asmussen et al. |
| 2003/0182052 | A1* | 9/2003 | DeLorme et al. ............ 701/201 |
| 2004/0093620 | A1 | 5/2004 | Iino et al. |
| 2004/0174443 | A1 | 9/2004 | Simske |
| 2004/0246376 | A1 | 12/2004 | Sekiguchi et al. |
| 2006/0167903 | A1* | 7/2006 | Smith et al. .................. 707/100 |
| 2006/0179453 | A1 | 8/2006 | Kadie et al. |
| 2007/0060112 | A1 | 3/2007 | Reimer |
| 2007/0143787 | A1 | 6/2007 | Cankaya |
| 2008/0226119 | A1 | 9/2008 | Candelore et al. |
| 2010/0329574 | A1* | 12/2010 | Moraleda et al. ............ 382/217 |
| 2011/0279445 | A1* | 11/2011 | Murphy et al. ................ 345/419 |
| 2012/0256947 | A1* | 10/2012 | Akira et al. ................... 345/619 |
| 2013/0073738 | A1* | 3/2013 | Reisman ....................... 709/227 |

FOREIGN PATENT DOCUMENTS

| | | |
|---|---|---|
| JP | 4-363989 A | 12/1992 |
| JP | 2000-196933 A | 7/2000 |
| JP | 10-2004-0108232 A | 12/2004 |
| JP | 2006-309631 A | 11/2006 |
| KR | 10-1997-0009296 A | 2/1997 |
| KR | 10-2000-0033065 A | 6/2000 |
| KR | 100323679 B1 | 1/2002 |
| KR | 10-2006-0134337 A | 12/2006 |

OTHER PUBLICATIONS

European Search Report, dated Dec. 21, 2010, issued in Application No. 08103214.6.
Hakola L., "PrintAccess", Graphic Arts in Finland, Oct. 31, 2005, pp. 12-59, vol. 34, No. 2.
Chinese Office Action issued Aug. 12, 2022 in corresponding Chinese Patent Application No. 200810083046.9.
Communication from the State Intellectual Property Office of the People's Republic of China issued May 3, 2012, in counterpart Application No. 200810083046.9.
Communication dated May 27, 2014, issued by the Korean Intellectual Property Office in counterpart Korean Application No. 10-2007-0032867.
Communication dated Jun. 26, 2014, issued by the United States Patent and Trademark Office in counterpart U.S. Appl. No. 13/782,753.
Communication dated Feb. 27, 2014 issued by the State Intellectual Property Office of the People's Republic of China in counterpart Chinese Patent Application No. 200810083046.9.
Communication dated Sep. 4, 2014 issued by the European Patent Office in counterpart European Patent Application No. 08 103 214.6.
Communication dated Oct. 20, 2014 issued by the United States Patent and Trademark Office in counterpart U.S. Appl. No. 13/782,753.

* cited by examiner

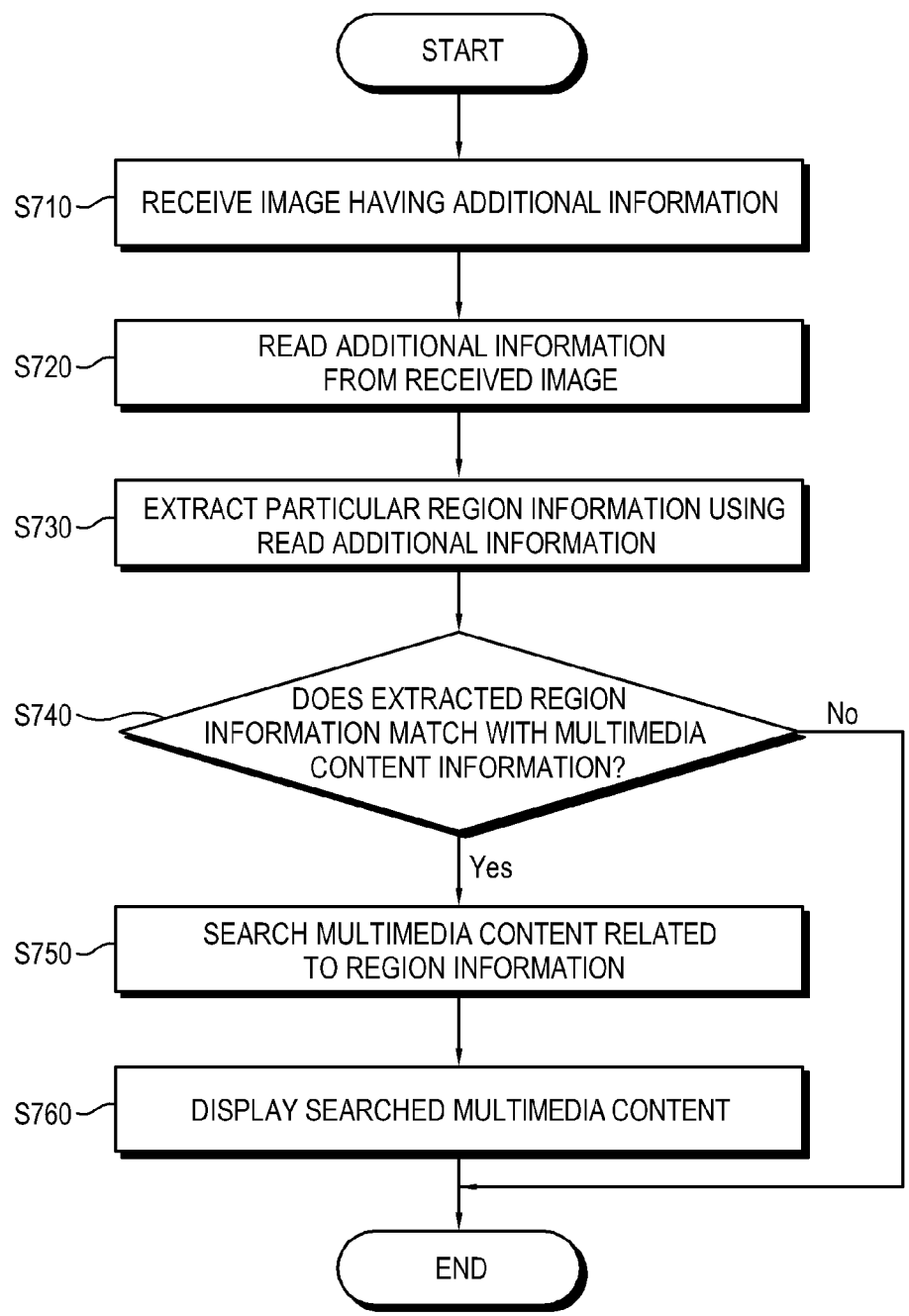

APPARATUS AND METHOD FOR SEARCHING MULTIMEDIA CONTENT

CROSS-REFERENCE TO RELATED APPLICATIONS

This application claims priority from Korean Patent Application No. 10-2007-0032867, filed on Apr. 3, 2007 in the Korean Intellectual Property Office, the disclosure of which is incorporated herein by reference. This application is further a Continuation-in-Part of U.S. patent application Ser. No. 11/953,965 filed on Dec. 11, 2007 by Lee et al, the entire disclosure of which is also incorporated herein by reference.

BACKGROUND OF INVENTION

1. Field of Invention

Apparatuses and methods consistent with the present invention relate to searching a multimedia content, and more particularly, to an apparatus and method for searching a multimedia content using additional information added to an image.

2. Description of the Related Art

In recent years, with the rapid spread of digital cameras, applied products such as information technology (IT) products having a global positioning system (GPS) function have come into the market.

For example, "iPAQ rx5000" (available from HP Korea, Co., Ltd), a kind of personal digital assistant (PDA) having a GPS function, has a high performance integrated antenna and receiver to provide a navigation function. This "iPAQ rx5000" receives a photograph having GPS information from another PDA or digital camera and displays the GPS information on a map. For example, if a consumer who uses a home-delivery service transmits a photograph including GPS information to a home-delivery service provider, the home-delivery service provider may deliver goods to the consumer based on the GPS information included in the transmitted photograph, which may allow its service to reach a wider area.

In addition, "GPS-CS1" (available from Sony Korea, Co., Ltd.), a mobile GPS receiver that can record position information through a digital camera connected thereto, stores the information by time when a user takes a photograph, and shows the photograph on a map along a user's path of movement when the user uses a related map software in a PC. "GPS-CS1" is used to store time and position information required for business related to construction, real estate and so on and to allow persons who take photographs as hobbies to manage the photographs without difficulty.

In addition, "D2H2" (available from Nikon, Co. Ltd.) is useful for architecture and road construction contractors who need information on positions of photographed places. Also, Nikon added a GPS function to a different Digital Single-Lens Reflex Camera (DSLR), "D200."

On the other hand, related techniques using the GPS information provide road guidance, the shortest route, traffic information and so on in the automobile field and are used for digital maps, underground utility maps, geodetic survey and so on in the geographic information field. Additionally, the techniques are used for landing, air route, aviation traffic and so on in the aviation field, orbit determination, posture determination and so on in the aerospace field, and harbor access, normal navigation routes, distress signals, oil land detection, fish tracing and so on in the ship and marine field.

A related TV channel search system displays a channel list according to an automatic channel search instruction from a user and searches channels in a channel number order in the channel list, as described in Korean Patent Registration No. 10-0323679. However, it takes much time for this system to find a channel or TV program desired by the user.

SUMMARY OF THE INVENTION

Accordingly, it is an aspect of the present invention to provide a multimedia content searching apparatus capable of finding a multimedia content desired by a user without difficulty using additional information (including GPS information) that has been added to an image.

Another aspect of the present invention is to provide a multimedia content searching method capable of finding a multimedia content desired by a user without difficulty using additional information (including GPS information) added to an image.

Additional aspects of the present invention will be set forth in part in the description which follows and, in part, will be obvious from the description, or may be learned by practice of the present invention.

The foregoing and/or other aspects of the present invention can be achieved by providing a multimedia content searching apparatus including: an image receiving unit that receives an image having additional information from an external device; an additional information reading unit that reads the additional information from the image received from the image receiving unit; a multimedia content searching unit that recommends a multimedia content to a user by searching for the multimedia content which is related to the additional information using the additional information read by the additional information reading unit; and an information comparing unit that compares the additional information read by the additional information reading unit with multimedia content information provided from a content provider, and the multimedia content searching unit searches for the multimedia content related to the additional information based on the result of the comparison by the information comparing unit.

According to an aspect of the invention, the additional information includes global positioning system (GPS) information and the image includes a photograph.

According to an aspect of the invention, the multimedia content may include at least one of a TV program, a video on demand (VOD), a user created content (UCC) and an electronic program guide (EPG).

According to an aspect of the invention, the multimedia content searching apparatus may further includes a display which broadcasts the TV program currently being provided by a TV channel, wherein the TV program matches the additional information provided from the external device as user input and wherein the TV program comprises at least one of travel guides, fishing, food, and tourist resort for the location identified by the additional information.

According to an aspect of the invention, the multimedia content searching apparatus may further include a region information extracting unit that extracts particular region information using the additional information read by the additional information reading unit, and the information comparing unit may compare the region information extracted by the region information extracting unit with the multimedia content information provided from the content provider, and the multimedia content searching unit may search for the multimedia content related to the region information based on the result of the comparison by the information comparing unit.

According to an aspect of the invention, the multimedia content searching apparatus may further include a controller that controls the image receiving unit, the additional information reading unit, the region information extracting unit, the information comparing unit and the multimedia content searching unit.

According to an aspect of the invention, the multimedia content searching apparatus may further include a display unit that displays the result of the search by the multimedia content searching unit.

According to an aspect of the invention, the display unit may display the result of search by the multimedia content searching unit by directly tuning to a related TV channel, by displaying an arrayed representative set of pictures of related TV channels currently broadcasting on the entire screen or by displaying a list of channels which will be broadcasted in the future.

According to an aspect of the invention, the result of the search may be displayed to enable a reservation for viewing in advance or a reserved recording.

According to an aspect of the invention, the multimedia content searching apparatus may further include a memory that stores the image having the additional information, multimedia content information and various kinds of data and programs.

According to an aspect of the invention, the image having additional information may be a user query received from the external device by the image receiving unit and the multimedia content searching unit may search for multimedia content being broadcast by program channels based on the additional information without the received image, where the additional information is extracted from the query.

According to an aspect of the invention, the multimedia content searching unit may compare the additional information extracted from the image received as user query from another external device with the multimedia content information provided by the external device.

The foregoing and/or other aspects of the present invention can be achieved by providing a multimedia content searching method including: receiving an image with additional information from an external device; reading the additional information from the received image; comparing the read additional information with multimedia content information provided from a content provider; and recommending a multimedia content by searching for the multimedia content related to the additional information using the read additional information, and the multimedia content related to the additional information is searched based on a result of comparison.

According to an aspect of the invention, the additional information includes global positioning system (GPS) information and the image includes a photograph.

According to an aspect of the invention, the multimedia content may include at least one of a TV program, a video on demand (VOD), a user created content (UCC) and an electronic program guide (EPG).

According to an aspect of the invention, the multimedia content searching method further includes extracting particular region information using the read additional information, and the extracted region information may be compared with the multimedia content information provided from the content provider, and the multimedia content related to the region information may be searched for based on the result of the comparison.

According to an aspect of the invention, the multimedia content searching method further includes displaying a result of search.

According to an aspect of the invention, the displaying the result of search includes displaying to directly tune to a related TV channel, to array representative pictures of related TV channels currently broadcasting on the entire screen or to display a list of channels which will be broadcasted in the future.

According to an aspect of the invention, if the result of search is displayed as the list of channels which will be broadcasted in the future, the result of search is displayed to enable a reservation for view in advance or a reserved recording.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 7 is a flow chart illustrating a multimedia content searching method according to still another exemplary embodiment of the present invention.

DETAILED DESCRIPTION OF EXEMPLARY EMBODIMENTS OF THE INVENTION

Figure 1:
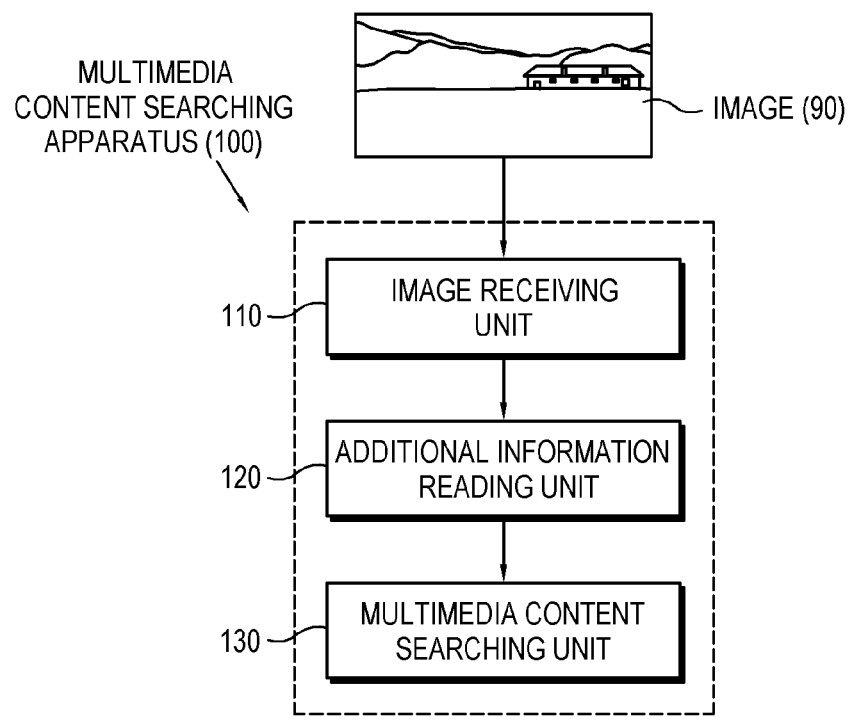
FIG. 1 is a schematic view showing a configuration of a multimedia content searching apparatus according to an exemplary embodiment of the present invention.

Reference will now be made in detail to exemplary embodiments of the present invention, examples of which are illustrated in the accompanying drawings, wherein like reference numerals refer to like elements throughout. The exemplary embodiments are described below so as to explain the present invention by referring to the figures.

FIG. 1 is a schematic view showing a configuration of a multimedia content searching apparatus according to an exemplary embodiment of the present invention.

Referring to FIG. 1, a multimedia content searching apparatus 100 using additional information added to an image according to an exemplary embodiment of the present invention includes an image receiving unit 110, an additional information reading unit 120 and a multimedia content searching unit 130.

The image receiving unit 110 receives an image 90 including additional information from an external device (for example, a digital camera having a GPS function).

The additional information reading unit 120 reads the additional information out of the image received by the image receiving unit 110.

The multimedia content searching unit 130 searches a multimedia content related to the additional information using the additional information read by the additional information reading unit 120.

Here, the additional information may include GPS information and meta information, and the image 90 may include a photograph, a still image and a motion picture. In addition, the GPS information may include information on latitude, longitude, altitude, world time and so on based on a photographed time.

Here, one or more of the multimedia content is provided from various content providers. For example, the multimedia content may include a TV program provided from a broadcasting station, a video on demand (VOD) provided via a wired and/or wireless communication network, a user created content (UCC) which is created by using an information device like a digital camera and provided via a wired and/or wireless communication network by a user, and an electronic program guide (EPG) provided from a wired and/or wireless broadcaster.

Figure 2:
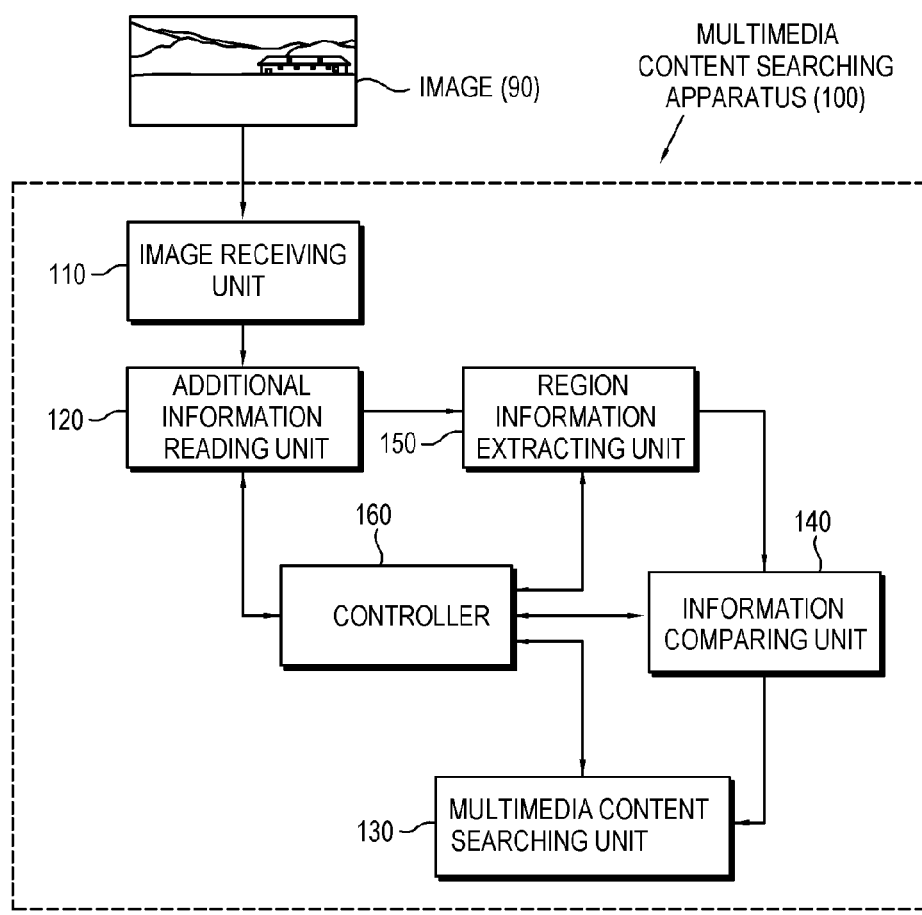
FIG. 2 is a schematic view showing region information extracting unit, an information comparing unit and a controller, which are further added to the multimedia content searching apparatus of FIG. 1, according to another exemplary embodiment of the present invention.

In addition, as another exemplary embodiment of the present invention, a multimedia content searching apparatus 100 may further include an information comparing unit 140 that compares the additional information read by the additional information reading unit 120 with multimedia content information provided from a content provider like a broadcasting station, as shown in FIG. 2. In this exemplary embodiment, the multimedia content searching unit 130 searches the multimedia content related to the additional information based on a result of comparison by the information comparing unit 140.

In addition, the multimedia content searching apparatus 100 may further include a region information extracting unit 150 that extracts a particular region information using the additional information read by the additional information reading unit 120. At this time, the information comparing unit 140 compares the region information extracted by the region information extracting unit 150 with the multimedia content information provided from the content provider like a broadcasting station, and the multimedia content searching unit 130 searches for the multimedia content or programs related to the region information based on the result of the comparison by the information comparing unit 140. In this exemplary embodiment, a general navigator may be used as the region information extracting unit 150. If the multimedia content searching apparatus 100 of the present invention is embodied by a digital TV, such a navigator may be installed within the digital TV or provided separately outside of the digital TV.

In addition, the multimedia content searching apparatus 100 may include a controller 160 that controls the image receiving unit 110, the additional information reading unit 120, the region information extracting unit 150, the information comparing unit 140 and the multimedia content searching unit 130.

Figure 3:
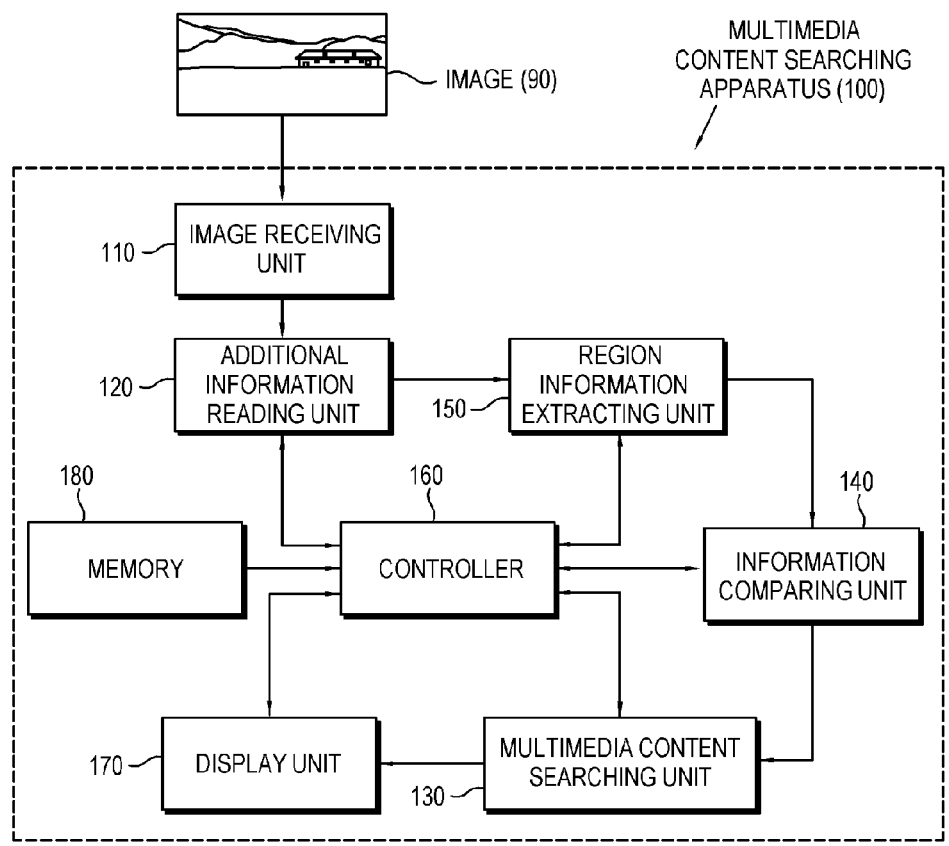
FIG. 3 is a schematic view showing a display unit and a memory, which are further added to the multimedia content searching apparatus of FIG. 2, according to still another exemplary embodiment of the present invention.

In still another exemplary embodiment of the present invention, the multimedia content searching apparatus 100 may include a display unit 170 that displays a result of search by the multimedia content searching unit 130, as shown in FIG. 3.

In this exemplary embodiment, the result of search by the multimedia content searching unit 130 may be displayed on the display unit 170 by direct tuning to a related TV channel, or as an arrayed representative pictures of related TV channels currently broadcasting on the entire screen or a list of related channels which will be broadcasted in the future, by presenting a searched VOD, UCC or by presenting EPG related to a viewing channel.

In addition, the multimedia content searching apparatus 100 may further include a memory 180 that stores the image having the additional information, multimedia content information, and various kinds of data and programs.

In this exemplary embodiment, the multimedia content searching apparatus 100 of the present invention may be embodied by a digital broadcasting receiver, such as a set top box (STB), which is separated from a display apparatus, or an electronic equipment, such as a digital multimedia broadcasting (DMB) phone or a digital TV, which is integrated with a display apparatus. If the multimedia content searching apparatus 100 is embodied by the set top box, a user may obtain information on a desired multimedia content by displaying the result of search by the multimedia content searching unit 130 on the separate display apparatus.

On the other hand, if the multimedia content searching apparatus 100 is embodied by the digital TV, the additional information reading unit 120, the multimedia content searching unit 130, the information comparing unit 140, the region information extracting unit 150 and the controller 160 may be embodied by a kind of computer program executed by a microprocessor. In this case, the computer program may be stored in a memory (RAM or ROM) contained in the digital TV. In addition, the computer program is programmed into a language adaptable to the microprocessor to operate the additional information reading unit 120, the multimedia content searching unit 130, the information comparing unit 140, the region information extracting unit 150 and the controller 160.

Figure 4:
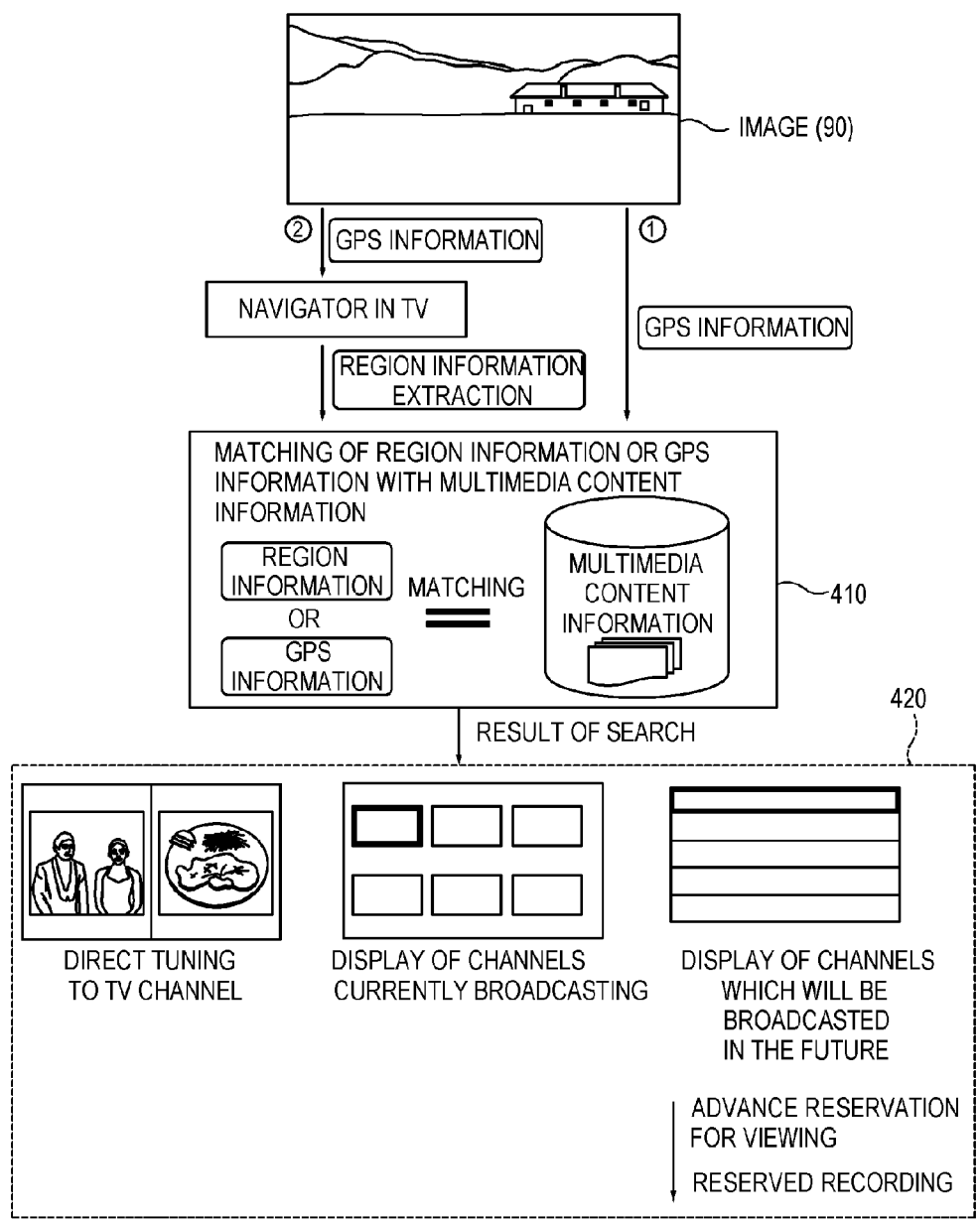
FIG. 4 is a schematic view showing an overall concept of a multimedia content searching method according to an exemplary embodiment of the present invention.
Figure 5:
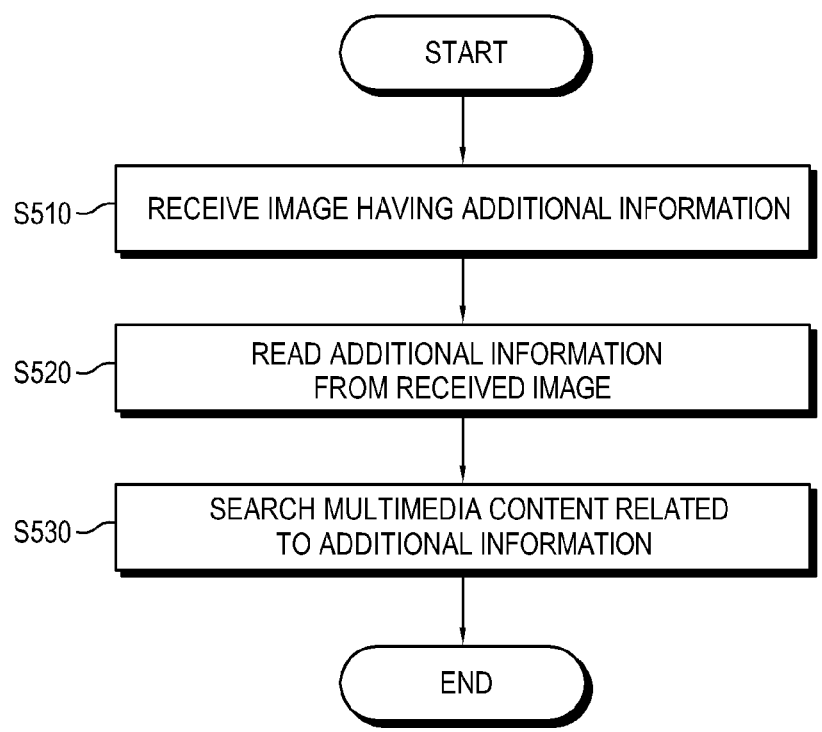
FIG. 5 is a flow chart illustrating a multimedia content searching method according to an exemplary embodiment of the present invention.
Figure 6:
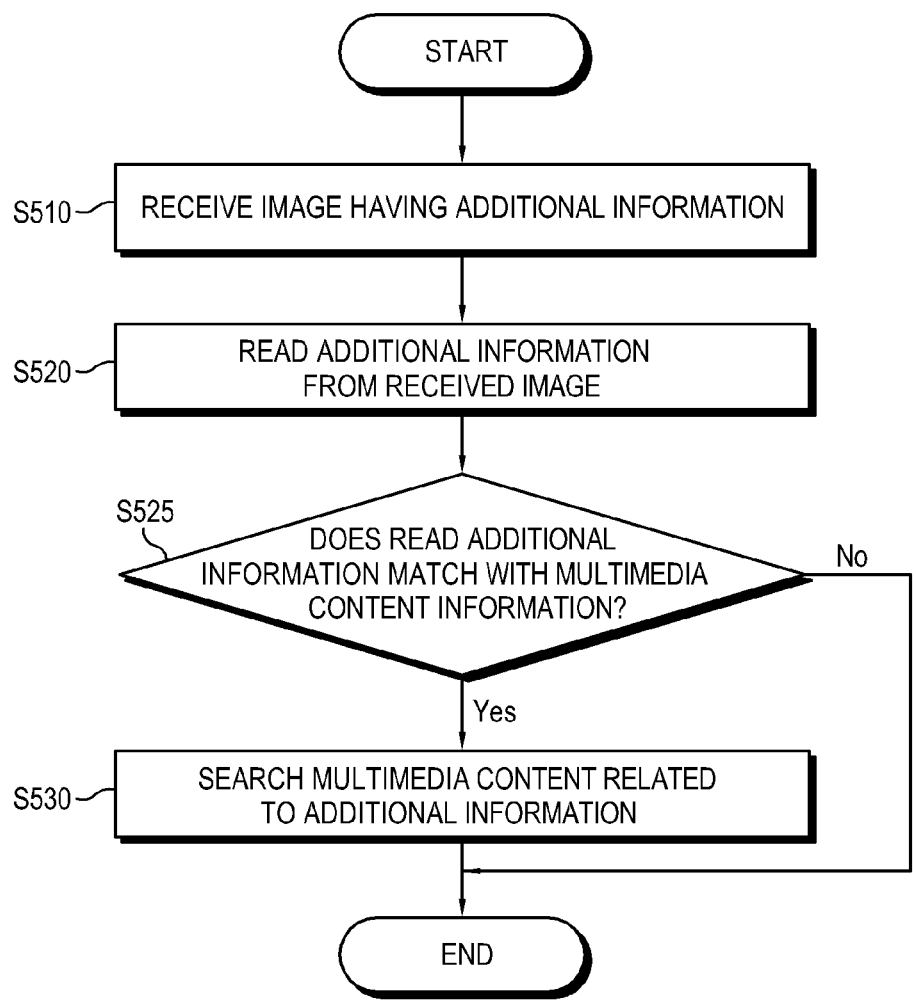
FIG. 6 is a flow chart illustrating a multimedia content searching method according to another exemplary embodiment of the present invention.

FIGS. 4 to 7 show several multimedia content searching methods of exemplary embodiments of the present invention. FIG. 4 is a schematic view showing the overall concept of a multimedia content searching method according to an exemplary embodiment of the present invention, FIG. 5 is a flow chart illustrating a multimedia content searching method according to an exemplary embodiment of the present invention, FIG. 6 is a flow chart illustrating a multimedia content searching method according to another exemplary embodiment of the present invention, and FIG. 7 is a flow chart illustrating a multimedia content searching method according to still another exemplary embodiment of the present invention.

Referring to FIGS. 4 and 5, in a multimedia content searching method according to an exemplary embodiment of the present invention, first, the image 90 having the additional information is received from an external device at operation S510. At this time, the received image 90 is stored in the memory 180. Here, the additional information may include GPS information, and the image may include a photograph.

When the image 90 having the additional information is received, the additional information (GPS information) is read from the received image 90 at operation S520 (route 1̂ in FIG. 4). Then, a multimedia content related to the additional information is searched using the read additional information at operation S530.

As another exemplary embodiment of the present invention, the multimedia content searching method may further include comparing the read additional information with multimedia content information provided from a content provider like a broadcasting station at operation S525, as shown in FIG. 6. At this time, the multimedia content related to the additional information is searched for based on the result of the comparison.

Here, the operation of comparing the read additional information with the multimedia content information provided from the content provider like a broadcasting station includes determining whether or not the additional information (GPS information) matches the multimedia content information (refer to 410 in FIG. 4). If it is determined that the additional information (GPS information) matches the multimedia content information, multimedia content or programs related to the additional information are searched for based on the result of the determination of a match, as described above. Here, the multimedia content information provided from the content provider like a broadcasting station is received in real time and stored in the memory 180.

As still another exemplary embodiment of the present invention, the multimedia content searching method may further include extracting particular region information using the additional information read by the additional information reading unit at operation S730 (route 2 in FIG. 4). Then, the extracted region information is compared with the multimedia content information provided from the content provider like a broadcasting station at operation S740, and a multimedia content related to the region information is searched for based on the result of the comparison at operation S750, as shown in FIG. 7. Here, the extraction of the particular region information may be performed by a navigator. That is, when the additional information read by the additional information reading unit is inputted to the navigator, the navigator displays a particular region corresponding to the GPS information on a map. Thus, a user can obtain the particular region information.

In addition, the multimedia content searching method may further include displaying the result of search at operation S760. At this time, as shown in 420 in FIG. 4, the result of search may be displayed by direct tuning to a related TV channel, or as an arrayed representative set of pictures of related TV channels currently broadcasting on the entire screen or a list of channels which will be broadcasted in the future, by presenting a searched VOD, UCC or by presenting EPG related to a viewing channel.

If the result of search is displayed as the list of channels which will be broadcasted in the future, it may be displayed to enable a reservation for viewing in advance or a reserved recording. At this time, a user can make the reservation for viewing in advance or the reserved recording by a user selection (for example, selection by manipulation of a remote controller or the like). Operations S710 and S720 in FIG. 7 correspond to the operations S510 and S520 in FIG. 5, and therefore, their details are not described here.

The user selects one of the above-mentioned displays types, and can find a desired multimedia content from the selected type of display using the additional information added to an image.

As is apparent from the above description, an aspect of the present invention provides a multimedia content searching apparatus and method which is capable of providing a user with multimedia content information corresponding to additional information added to an image, thereby allowing a user to find a desired multimedia content without difficulty.

In addition, an aspect of the present invention provides a multimedia content searching apparatus and method which can be utilized for a user to search programs such as travel guide, fishing, food, tourist resort and so on by providing the user with multimedia content information corresponding to additional information.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A displaying method of a broadcast receiving apparatus, the method comprising:
receiving an image signal including additional information and a broadcast signal;
displaying an image based on the image signal and a content based on the broadcast signal;
extracting location information from the additional information in association with the displayed image according to a user input;
searching a multimedia content based on the extracted location information; and
displaying a multimedia content list corresponding to the searched multimedia content.

2. The method according to claim 1, wherein the image comprises at least one of a still image, a photograph, and a motion picture, which has the additional information attached thereto.

3. The method according to claim 1, wherein the location information comprises global positioning system (GPS) information.

4. The method according to claim 1, further comprising recommending the multimedia content list by searching for the multimedia content comprising at least one of a TV program, a video on demand (VOD), a user created content (UCC), and an electronic program guide (EPG), related to the location information using the location information.

5. The method according to claim 1, further comprising comparing the location information with multimedia content information comprising information relating to the multimedia content, and searching for the multimedia content related to the location information based on the result of the comparison.

6. A broadcast receiving apparatus comprising:
a broadcast signal receiver configured to receive a broadcast signal;
an image signal receiver configured to receive an image signal including additional information;
a display configured to display an image based on the image signal and a content based on the broadcast signal;
a location information extraction unit configured to extract location information from the additional information in association with the displayed image according to a user input instruction;
a multimedia content searching unit configured to search a multimedia content based on the extracted location information; and
a controller configured to control the display to display a multimedia content list corresponding to the searched multimedia content.

7. The apparatus according to claim 6, wherein the image comprises at least one of a still image, a photograph and a motion picture, which has the additional information attached thereto.

8. The apparatus according to claim 6, wherein the location information comprises global positioning system (GPS) information.

9. The apparatus according to claim 6, wherein the multimedia content searching unit recommends the multimedia content list by searching for the multimedia content comprising at least one of a TV program, a video on demand (VOD), a user created content (UCC) and an electronic program guide (EPG), related to the location information using the location information.

10. The apparatus according to claim 6, wherein the multimedia content searching unit compares the location information with multimedia content information comprising information relating to the multimedia content, and searches for the multimedia content related to the location information based on the result of the comparison.

* * * * *